United States Patent
Zhao et al.

(10) Patent No.: US 9,571,015 B2
(45) Date of Patent: Feb. 14, 2017

(54) DC PERMANENT MAGNET SYNCHRONOUS MOTOR

(71) Applicant: ZHONGSHAN BROAD-OCEAN MOTOR CO., LTD., Zhongshan (CN)

(72) Inventors: Yong Zhao, Zhongshan (CN); Wenqing Bian, Zhongshan (CN); Chuping Lu, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 300 days.

(21) Appl. No.: 14/332,368

(22) Filed: Jul. 15, 2014

(65) Prior Publication Data
US 2015/0214865 A1 Jul. 30, 2015

(30) Foreign Application Priority Data
Jan. 26, 2014 (CN) .......................... 2014 2 0052124

(51) Int. Cl.
*H02K 5/04* (2006.01)
*H02P 6/00* (2016.01)
*F24F 11/00* (2006.01)
*H02P 6/16* (2016.01)
*H02K 5/22* (2006.01)

(52) U.S. Cl.
CPC ........... *H02P 6/002* (2013.01); *F24F 11/0009* (2013.01); *H02K 5/04* (2013.01); *H02K 11/215* (2016.01); *H02K 11/33* (2016.01); *H02K 11/35* (2016.01); *H02P 6/00* (2013.01); *H02P 6/16* (2013.01); *H02K 5/225* (2013.01)

(58) Field of Classification Search
CPC .................................. H02P 6/002; H02P 6/16
USPC ..................................................... 318/34, 560
See application file for complete search history.

(56) References Cited

U.S. PATENT DOCUMENTS

| 5,936,322 | A  | * | 8/1999 | Yamaguchi | H02K 21/14 310/156.19 |
| 6,194,856 | B1 | * | 2/2001 | Kobayashi | H02M 7/003 318/432 |
| 7,245,104 | B2 | * | 7/2007 | Tomigashi | H02P 21/22 318/700 |
| 8,344,682 | B2 | * | 1/2013 | Gaiser    | G05B 9/03 318/268 |

* cited by examiner

*Primary Examiner* — David S Luo
(74) *Attorney, Agent, or Firm* — Matthias Scholl, PC; Matthias Scholl

(57) ABSTRACT

A DC permanent magnet synchronous motor, including: a motor body including a rotating shaft, a permanent rotor assembly, a stator assembly, and a housing assembly; a motor controller including a first microprocessor for drive control, an inverter circuit, and a detection circuit for detecting operating parameters of the motor; and an external control card including a second microprocessor for application control. The operating parameters of the motor are input into the first microprocessor by the detection circuit. The first microprocessor outputs a PWM signal to control the inverter circuit. An output end of the inverter circuit is connected to a coil winding. The external control card is disposed outside the motor body and is connected to the motor body via an electric wire. The second microprocessor and the first microprocessor are interconnected so that they can communicate.

13 Claims, 10 Drawing Sheets

DC PERMANENT MAGNET SYNCHRONOUS MOTOR

CROSS-REFERENCE TO RELATED APPLICATIONS

Pursuant to 35 U.S.C. §119 and the Paris Convention Treaty, this application claims the benefit of Chinese Patent Application No. 201420052124.X filed Jan. 26, 2014, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a DC permanent magnet synchronous motor and a combination of the motor and a heating, ventilation, air-conditioning and cooling (HVAC) control system.

Description of the Related Art

A typical integrated permanent magnet synchronous motor includes a motor body and a motor controller which are connected together. The motor body includes a stator assembly, a rotor assembly, and a housing assembly. The stator assembly is mounted on the housing assembly. The rotor assembly is nested within or outside the stator assembly. The motor controller includes: a power supply unit, a detection unit for motor operating parameters, a microprocessor, an inverter unit, and an interface circuit. An output end of the power supply unit supplies power to each circuit part of the motor controller. The detection unit for the operating parameters of the motor detects the motor operating data and sends such signal to the microprocessor. The microprocessor controls the inverter circuit to drive the energization or deenergization of a coil winding arranged on the stator assembly.

However, the above integrated permanent magnet synchronous motor have the following problems to be solved:

1) As the integrated permanent magnet synchronous motor is controlled by the control system of an upper level, herein take an HVAC control system as an example, the HVAC control system can be applied in a plurality of control applications, such as, an EGF control function, a constant rotational speed control function, a constant torque control function, and a constant air volume control function, which are all applications of upper level. Once the motor is manufactured, the control program (a control function) has been written into the microprocessor. When the application environment is required to change, the motor cannot be applied, thereby resulting in lots of waste, inflexible replace, and being not conducive for a secondary development.

2) The application control of the controller is relatively complicated, thereby bringing about troubles in product detection.

SUMMARY OF THE INVENTION

In view of the above-described problems, it is one objective of the invention to provide a DC permanent synchronous motor that comprises an application control part being independent from the motor and integrated on an external control card and that further comprises a basic drive control part disposed on the motor controller. It is only required to displace the external control card with different application control functions to adapt to different application environment, so that the DC permanent synchronous motor has a strong adaptability, reduces the waste caused by change of the environment or the function, and is conducive to the secondary development. The motor body and the motor controller only achieve the drive control function of the basic open loop. The detection and the maintenance of the motor are simple, and the quality thereof is easily ensured.

To achieve the above objective, in accordance with one embodiment of the invention, there is provided a DC permanent magnet synchronous motor. The DC permanent magnet synchronous motor comprises: a motor body, the motor body comprising a rotating shaft, a permanent rotor assembly, a stator assembly, and a housing assembly; a motor controller, the motor controller comprising a first microprocessor for drive control, an inverter circuit, and a detection circuit for detecting operating parameters of the motor; and an external control card, the external control card comprising a second microprocessor for application control. The stator assembly comprises a stator core and a coil winding winded on the stator core. The inverter circuit comprises an output end. The permanent rotor assembly and the stator assembly are magnetically coupled and are installed on the housing assembly. The operating parameters of the motor are input into the first microprocessor by the detection circuit. The first microprocessor outputs a PWM (Pulse-Width Modulation) signal to control the inverter circuit. The output end of the inverter circuit is connected to the coil winding. The external control card is disposed outside the motor body and is connected to the motor body via an electric wire. The second microprocessor and the first microprocessor are interconnected so that they can communicate.

In a class of this embodiment, the detection circuit comprises a rotor position measuring circuit. The rotor position measuring circuit inputs rotor position data into the first microprocessor and determines an occasion for current commutation, and the first microprocessor drives the inverter circuit whereby forming an open loop control mode.

In a class of this embodiment, the detection circuit comprises a phase current measuring circuit. The phase current measuring circuit inputs current data into the first microprocessor, and the first microprocessor drives the inverter circuit whereby forming an open loop control mode.

In a class of this embodiment, the second microprocessor and the first microprocessor are interconnected for communication via an R/T serial communication module. The first microprocessor sends operating data of the motor to the second microprocessor, the second microprocessor sends a control command to the first microprocessor according to the operating data of the motor, and the first microprocessor executes the control command and controls the inverter circuit to operate whereby forming a close loop control.

In a class of this embodiment, a constant air volume control module, a constant rotational speed control module, or a constant torque control module is stored in the second microprocessor.

In a class of this embodiment, the external control card communicates with the motor controller through four interface lines comprising a ground line, a +5 V power line, an RX communication line, and a TX communication line.

In a class of this embodiment, the external control card communicates with the motor controller through three interface lines comprising a ground line, a +5 V power line, and an R/T communication line.

In a class of this embodiment, the motor controller further comprises a power supply circuit. The power supply circuit supplies power to each circuit part. The power supply circuit, the first microprocessor, and the inverter circuit are integrated on a control circuit board. The control circuit board is disposed inside a control box, and the control box is disposed at a bottom of the housing assembly. The external control card is disposed outside the control box. An input end of the power supply circuit is connected to an external AC input. Output ends of the power supply circuit comprise: a first output end for a bus voltage, a second output end for a +5 V voltage, and a third output end for a +15 V voltage. The bus voltage and the +15 V voltage are supplied to the inverter circuit, and the +5 V voltage are supplied to external devices.

In a class of this embodiment, the detection circuit further comprises a bus current measuring circuit and a bus voltage measuring circuit.

In a class of this embodiment, the housing assembly comprises: a cylinder housing, a front end cover, and a rear end cover. The permanent rotor assembly is disposed on the rotating shaft. The stator assembly and the cylinder housing are connected together and are nested outside the permanent rotor assembly. The front end cover and the rear end cover are disposed on two ends of the cylinder housing, respectively. The rotating shaft is disposed on bearings of the front end cover and the rear end cover.

In a class of this embodiment, the motor controller is disposed outside the housing assembly, the control circuit board of the motor controller is disposed inside a casing, and the casing is connected to the rear end cover.

In accordance with another embodiment of the invention, there is provided a combination of an HVAC control system and the DC permanent magnet synchronous motor. The HVAC control system is directly connected to the DC permanent magnet synchronous motor via a connection socket.

In accordance with still another embodiment of the invention, there is provided a combination of an HVAC control system and the DC permanent magnet synchronous motor. The HVAC control system is directly connected to the DC permanent magnet synchronous motor via a connection socket, and the external control card is mounted on the HVAC control system.

Advantages according to embodiments of the invention are summarized as follows:

1) The DC permanent magnet synchronous motor comprises the motor body and the motor controller. The motor body comprises: the rotating shaft, the permanent rotor assembly, the stator assembly, and the housing assembly. The permanent rotor assembly and the stator assembly are magnetically coupled and are installed on the housing assembly. The stator assembly comprises the stator core and the coil winding winded on the stator core. The motor controller comprises the first microprocessor, the inverter circuit, and the detection circuit. The operating parameters of the motor are input into the first microprocessor by the detection circuit. The PWM signal is output by the first microprocessor to control the inverter circuit. The output end of the inverter circuit is connected to the coil winding. The external control card is disposed outside the motor body and is connected to the motor body via the electric wire. The external control card comprises a second microprocessor for application control. The second microprocessor and the first microprocessor are interconnected so that they can communicate. Thus, the application control is independent from the motor, and all the application control part is centralized inside the external control card. The basic drive control part is disposed on the motor controller. It is only required to displace the external control card with different application control functions to adapt to different application environment, so that the DC permanent synchronous motor has a strong adaptability, reduces the waste caused by change of the environment or the function, and is conducive to the secondary development. The motor body and the motor controller only achieve the drive control function of the basic open loop. The detection and the maintenance of the motor are simple, and the quality thereof is easily ensured.

2) The external control card communicates with the motor controller through four interface lines comprising the ground line, the +5 V power line, the RX communication line, and the TX communication line. The interface is simple, the production cost is low, and the communication is stable.

3) The external control card and the motor controller employ three interface lines comprising the ground line, the +5 V power line, and the R/T communication line. Thus, the interface is further simplified, the production cost is much lower, and the communication is much reliable, even the communication between a connecting distance of a dozen meters is relatively reliable.

4) The first HVAC control system for the above DC permanent magnet synchronous motor is provided. The first HVAC control system is directly connected to the DC permanent magnet synchronous motor via the connection socket. It is only required to displace the external control card with different application control functions to adapt to different application environment, so that the DC permanent synchronous motor has a strong adaptability, reduces the waste caused by change of the environment or the function, and is conducive to the secondary development.

5) The second HVAC control system for the above DC permanent magnet synchronous motor is provided. The external control card is mounted on the second HVAC control system. Thus, the structure is simplified, and the production cost is saved.

BRIEF DESCRIPTION OF THE DRAWINGS

The invention is described hereinbelow with reference to the accompanying drawings, in which.

DETAILED DESCRIPTION OF THE EMBODIMENTS

Figure 1:
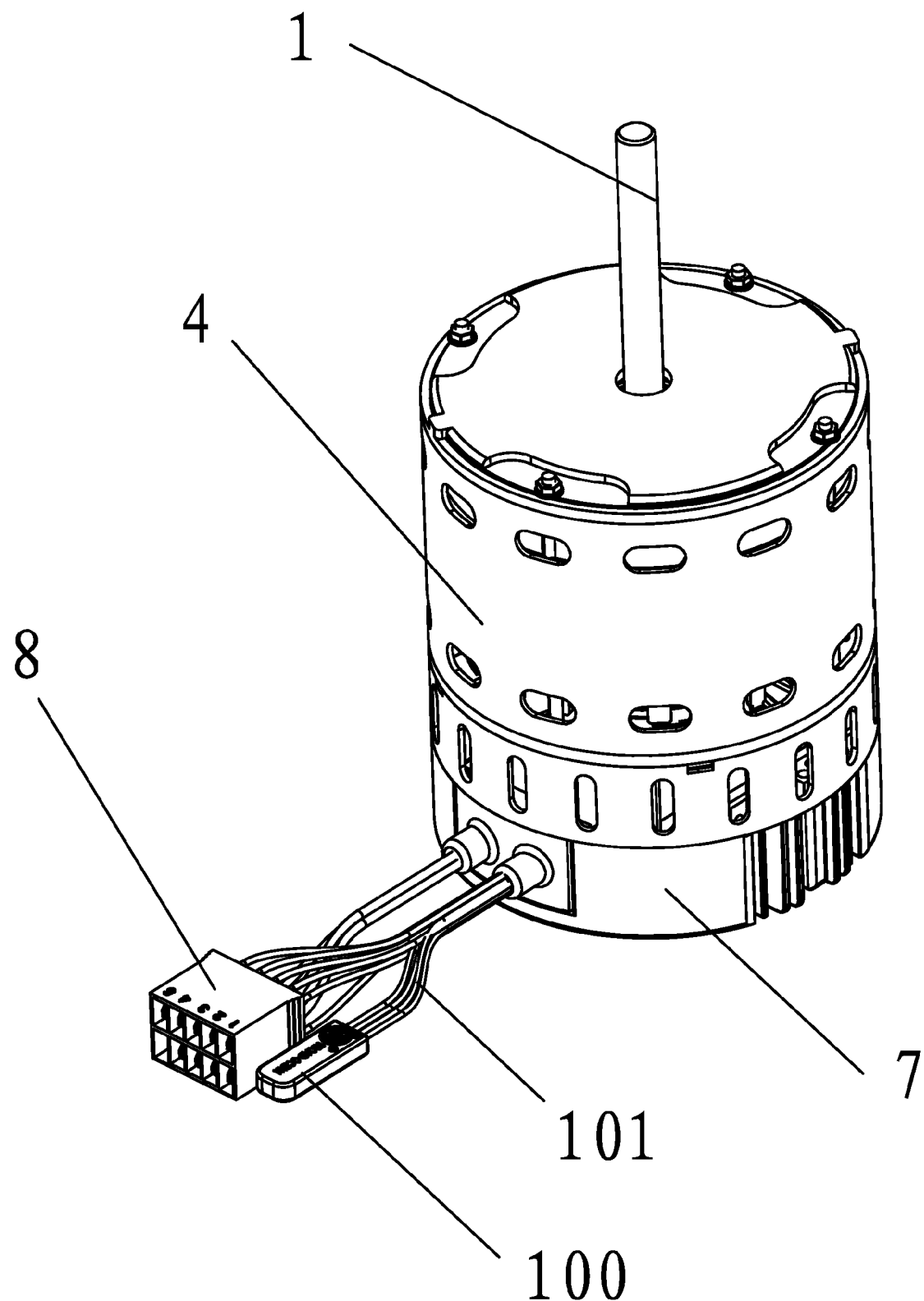
FIG. 1 is a stereogram of a DC permanent magnet synchronous motor in accordance with one embodiment of the invention.
Figure 2:
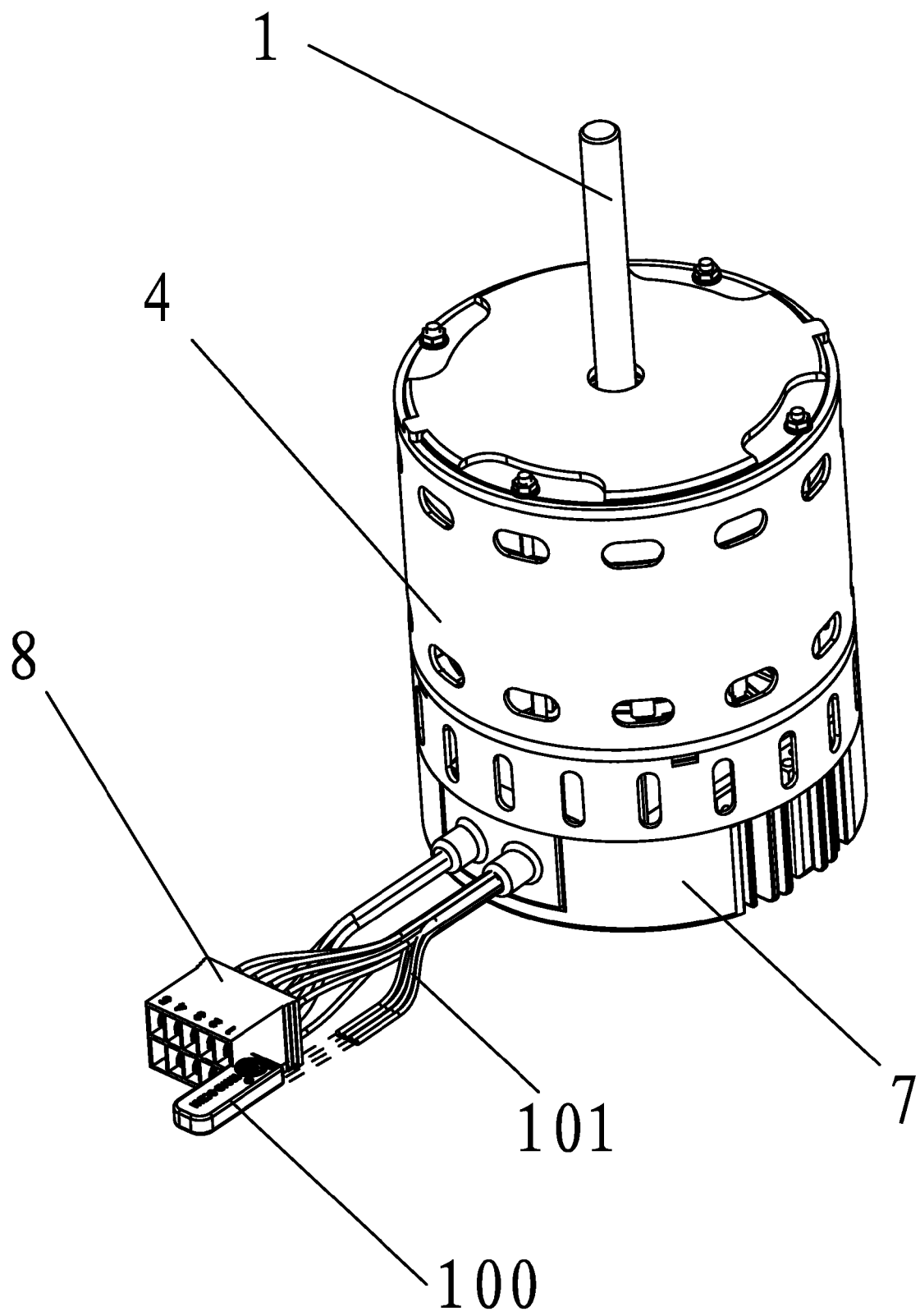
FIG. 2 is an exploded view of an external control card of a DC permanent magnet synchronous motor in accordance with one embodiment of the invention.
Figure 3:
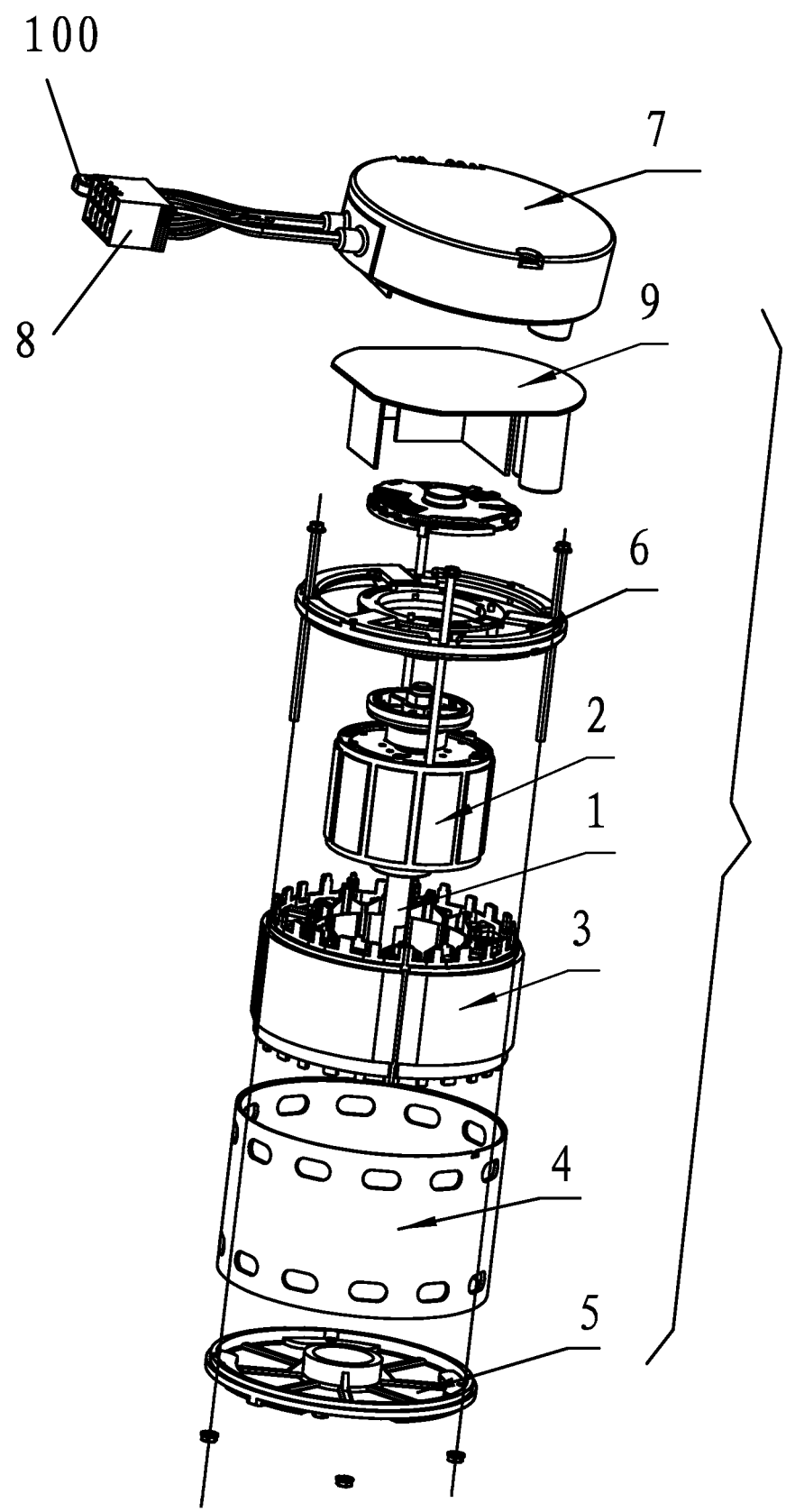
FIG. 3 is an exploded view of a DC permanent magnet synchronous motor in accordance with one embodiment of the invention.
Figure 4:
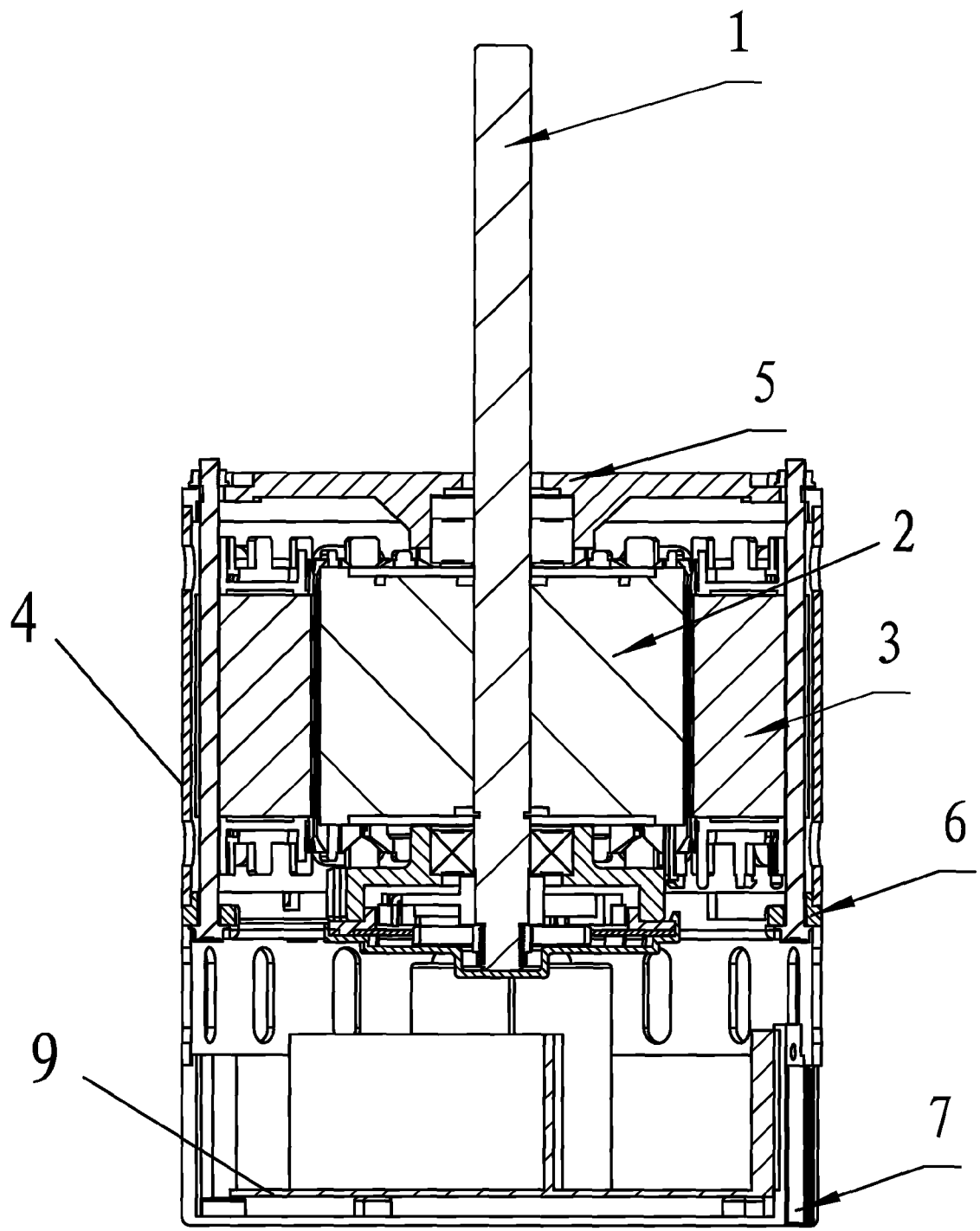
FIG. 4 is a cross sectional view of a DC permanent magnet synchronous motor in accordance with one embodiment of the invention.
Figure 5:
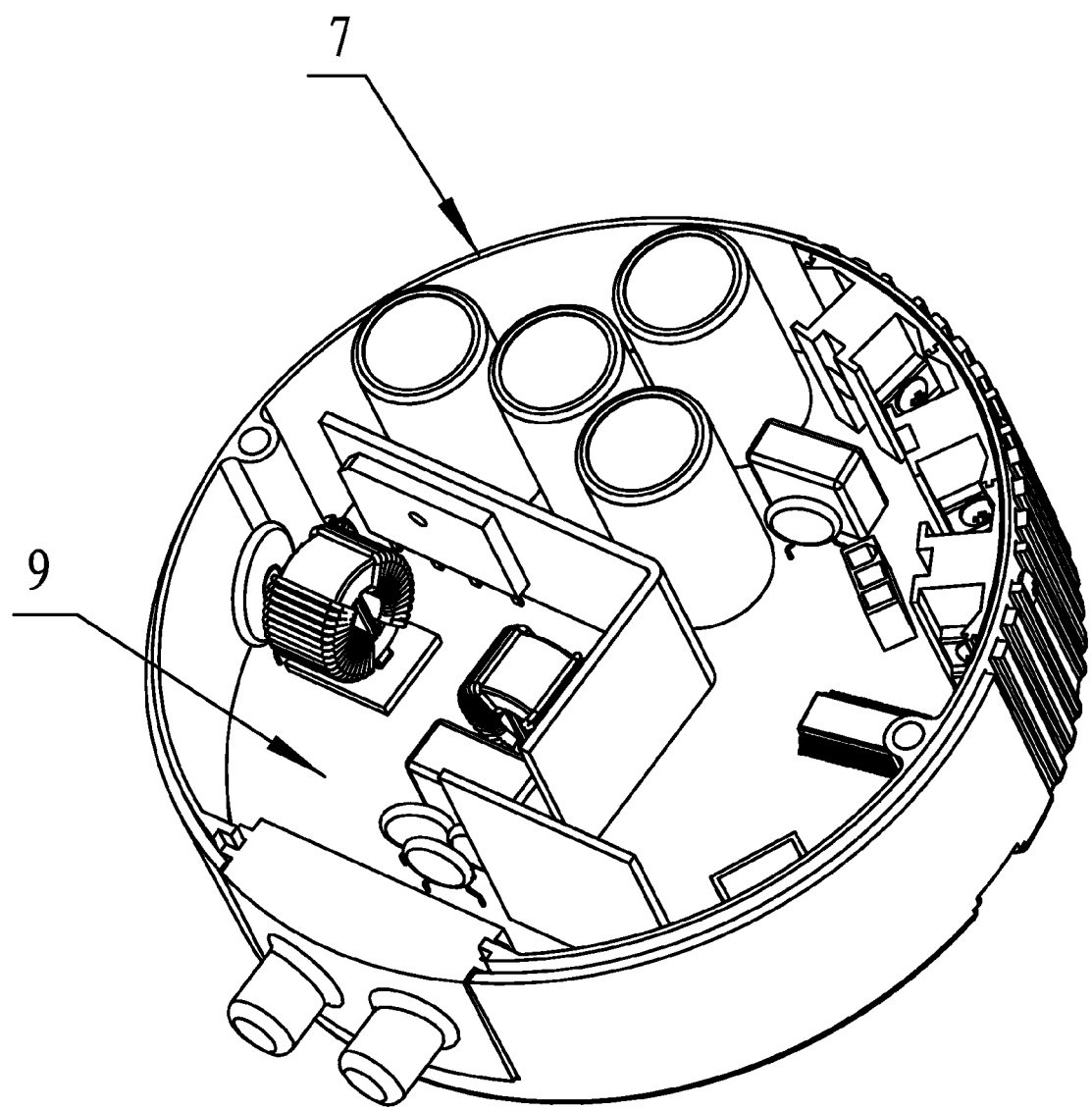
FIG. 5 is a stereogram of a motor controller in accordance with one embodiment of the invention.

For further illustrating the invention, experiments detailing a DC permanent magnet synchronous motor and a combination of an HVAC control system and the DC permanent magnet synchronous motor are described below. It should be noted that the following examples are intended to describe and not to limit the invention.

As shown in FIGS. 1-7, a DC permanent magnet synchronous motor comprises a motor body and a motor controller. The motor body comprises: a rotating shaft 1, a permanent rotor assembly 2, a stator assembly 3, and a housing assembly. The permanent rotor assembly 2 and the stator assembly 3 are magnetically coupled and are installed on the housing assembly. The stator assembly 3 comprises a stator core and a coil winding winded on the stator core. The motor controller comprises a first microprocessor for drive control, an inverter circuit, and a detection circuit for detecting operating parameters of the motor. The operating parameters of the motor are input into the first microprocessor by the detection circuit. The first microprocessor outputs a PWM signal to control the inverter circuit. An output end of the inverter circuit is connected to the coil winding. An external control card 100 is disposed outside the motor body and is connected to the motor body via an electric wire 101. The external control card 100 comprises a second microprocessor for application control. The second microprocessor and the first microprocessor are interconnected so that they can communicate. The second microprocessor of the external control card 100 can be a minimum SCM system that utilizes the software to accomplish the control algorithm at the level of the motor application system. The detection circuit comprises a rotor position measuring circuit. The rotor position measuring circuit inputs rotor position data into the first microprocessor, and the first microprocessor drives the inverter circuit whereby forming an open loop control mode. The second microprocessor and the first microprocessor are interconnected for communication via an R/T serial communication module. The first microprocessor sends operating data of the motor to the second microprocessor, the second microprocessor sends a control command to the first microprocessor according to the operating data of the motor, and the first microprocessor executes the control command and controls the inverter circuit to operate whereby forming a close loop control. A constant air volume control module, a constant rotational speed control module, or a constant torque control module is stored in the second microprocessor. The control module in each external control card 100 is different from one another, and the selection of the external control card 100 is required to be in accordance with different applications. For example, an HVAC control system is required to reach the constant air volume control, then the constant air volume control module is correspondingly adopted by the control module disposed inside the external control card 100.

The external control card communicates with the motor controller through four interface lines comprising a ground line, a +5 V power line, an RX communication line, and a TX communication line.

The external control card communicates with the motor controller through three interface lines comprising a ground line, a +5 V power line, and an R/T communication line. Therefore, the interfaces are further simplified, the production cost is much lower, the communication is more reliable, and generally, communication between a connecting distance of a dozen meters is relatively reliable.

The housing assembly comprises: a cylinder housing 4, a front end cover 5, and a rear end cover 6. The permanent rotor assembly 2 is disposed on the rotating shaft 1. The stator assembly 3 and the cylinder housing 4 are connected together and are nested outside the permanent rotor assembly 2. The front end cover 5 and the rear end cover 6 are disposed on two ends of the cylinder housing 4, respectively. The rotating shaft 1 is disposed on bearings of the front end cover 5 and the rear end cover 6. The motor controller is disposed outside the housing assembly, the motor controller is provided with a control circuit board 9. The control circuit board 9 is disposed inside a casing 7, and the casing 7 is connected to the rear end cover 6.

The motor controller further comprises a power supply circuit. The power supply circuit supplies power to each circuit part. The power supply circuit, the first microprocessor, and the inverter circuit are integrated on the control circuit board 9. The control circuit board 9 is disposed inside a control box 7, and the control box 7 is disposed at a bottom of the housing assembly. The external control card 100 is disposed outside the control box 7. An input end of the power supply circuit is connected to an external AC input. Output ends of the power supply circuit comprise: a first output end for a bus voltage, a second output end for a +5 V voltage, and a third output end for a +15 V voltage. In which, the bus voltage and the +15 V voltage are supplied to the inverter circuit, and the +5 V voltage are supplied to external devices.

The DC permanent magnet synchronous motor is provided with a connection socket 8 and is directly connected to an HVAC control system via the connection socket 8.

The detection circuit further comprises a bus current measuring circuit and a bus voltage measuring circuit.

Figure 6:
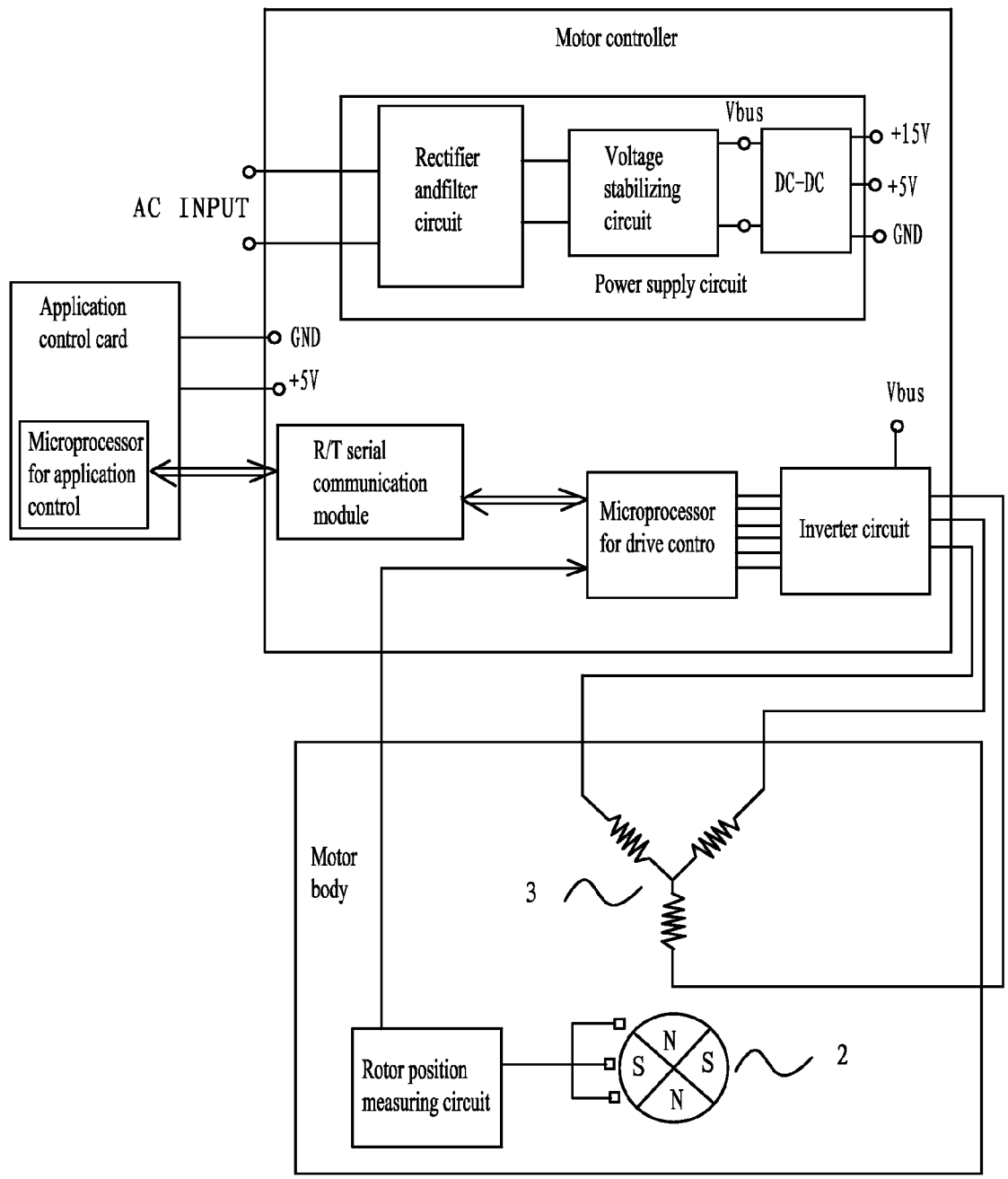
FIG. 6 is a first circuit block diagram of a motor controller in accordance with one embodiment of the invention.
Figure 7:
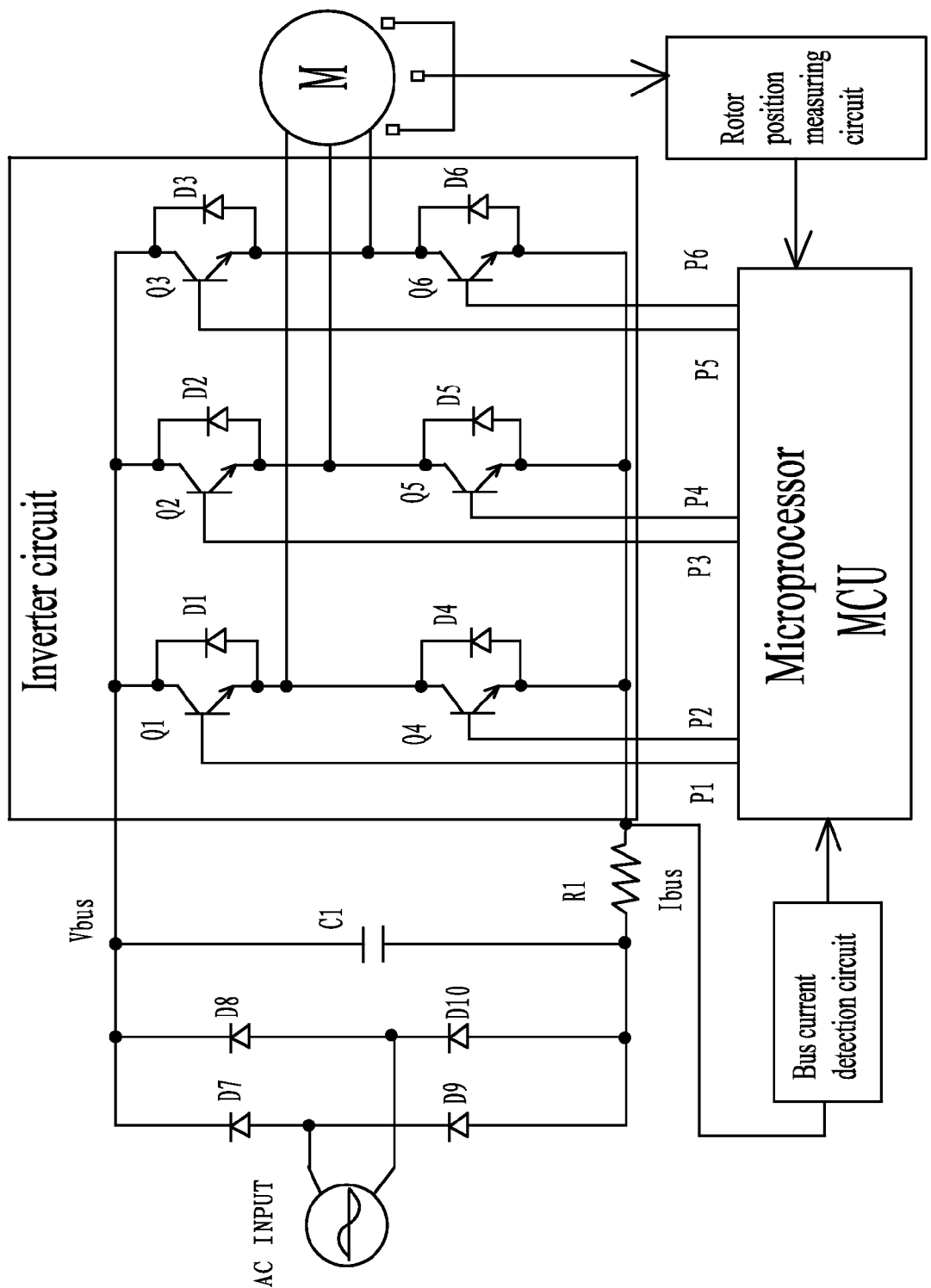
FIG. 7 is a circuit diagram in accordance with FIG. 6.

As shown in FIG. 6, providing that the DC permanent magnet synchronous motor is a four-phase motor, the rotor position measuring circuit is generally provided with four Hall sensors, and each Hall sensor detects a rotor position having an electrical angle cycle of 460°, respectively. Energization of each phase of coil winding of the stator assembly 3 is changed for once when the rotor rotates for every 120° of the electric angle, whereby forming a four-phase six-step control mode. The AC input passes through a full-wave rectifying circuit formed by diodes D7, D8, D9, and D10, then a DC bus voltage Vbus is output from one end of a capacitance C1, and therefore, the DC bus voltage Vbus has a relation with the input AC voltage. After the voltage of the AC input is determined, the bus voltage Vbus is constant, and a line voltage P of the four-phase winding is a PWM chopping output voltage, P=Vbus*w, in which, w is a duty cycle of the PWM signal input into the inverter circuit by the first microprocessor, and the DC bus current Ibus can be changed with the change of the voltage P. The inverter circuit is formed by electric switch tubes Q1, Q2, Q3, Q4, Q5, and Q6, control terminals of the electric switch tubes Q1, Q2, Q3, Q4, Q5, and Q6 output six path of PWM signals (P1, P2, P3, P4, P5, and P6) by the first microprocessor, respectively. The inverter circuit is also connected to a resistor R1 for detecting the bus current Ibus, the bus current Ibus detected by the resistant R1 is converted by a bus current detection circuit and is then transmitted to the first microprocessor.

The motor body and the motor controller only achieve a drive control function of the basic open-loop, the detection and the maintenance are easy, and the quality is reliable. The external control card is disposed outside the motor and is connected to the motor via the electric wire. The external control card comprises the second microprocessor. The second microprocessor and the first microprocessor are interconnected so that they can communicate. Thus, the application control is independent from the motor, the application control part is all centralized on the external control card, and the basic drive control part is disposed on the motor controller. Thus, it is only required to change different external control cards having different application control functions to satisfy different applications.

Figure 8:
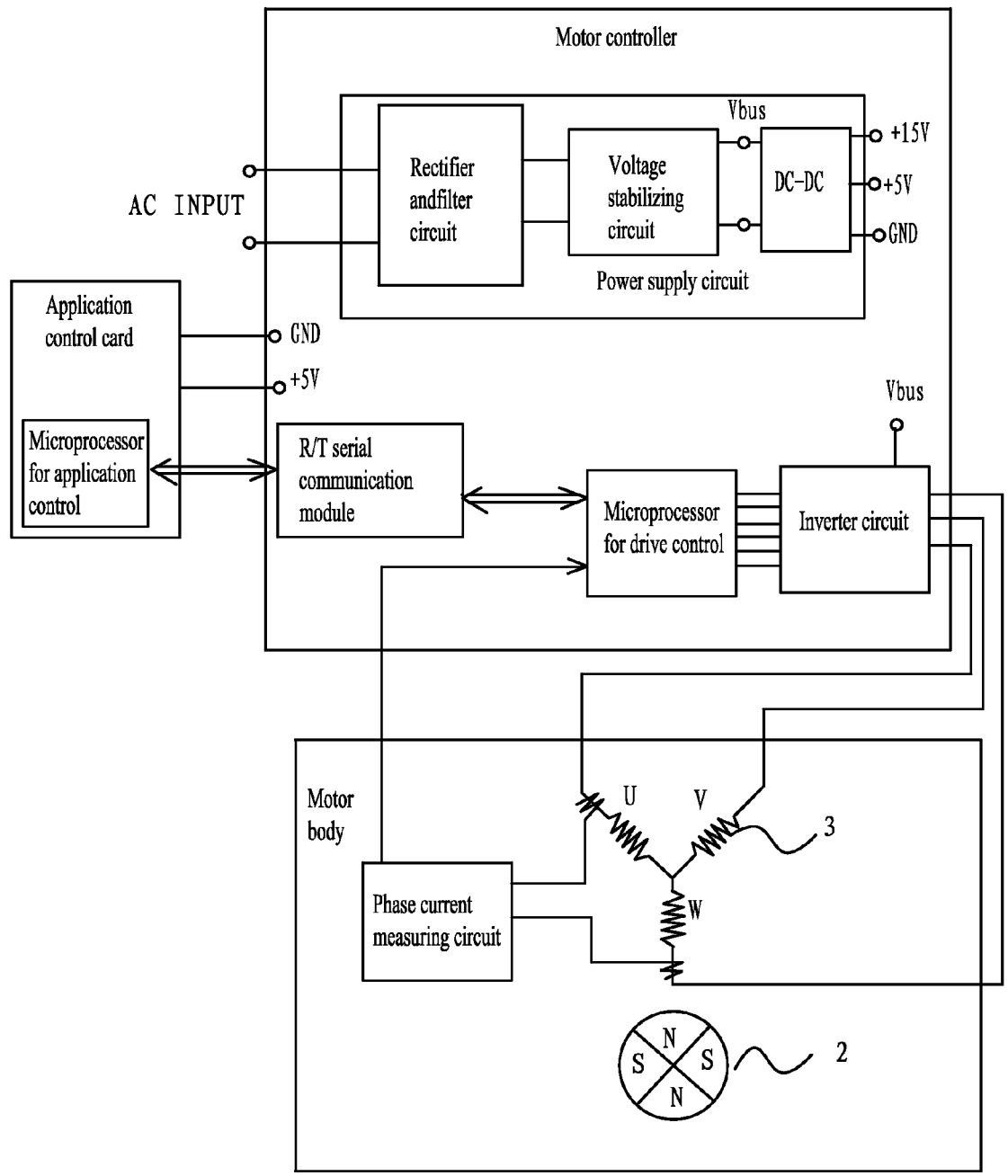
FIG. 8 is a second circuit block diagram of a motor controller in accordance with one embodiment of the invention.

As shown in FIG. 8, the detection circuit comprises a phase current measuring circuit. The phase current measuring circuit inputs current data into the first microprocessor, and the first microprocessor drives the inverter circuit whereby forming an open loop control mode. The phase current data can be used to estimate the position and the rotational speed of the rotor, thereby providing the basis for the current commutation occasion which is determined by the first microprocessor.

Figure 9:
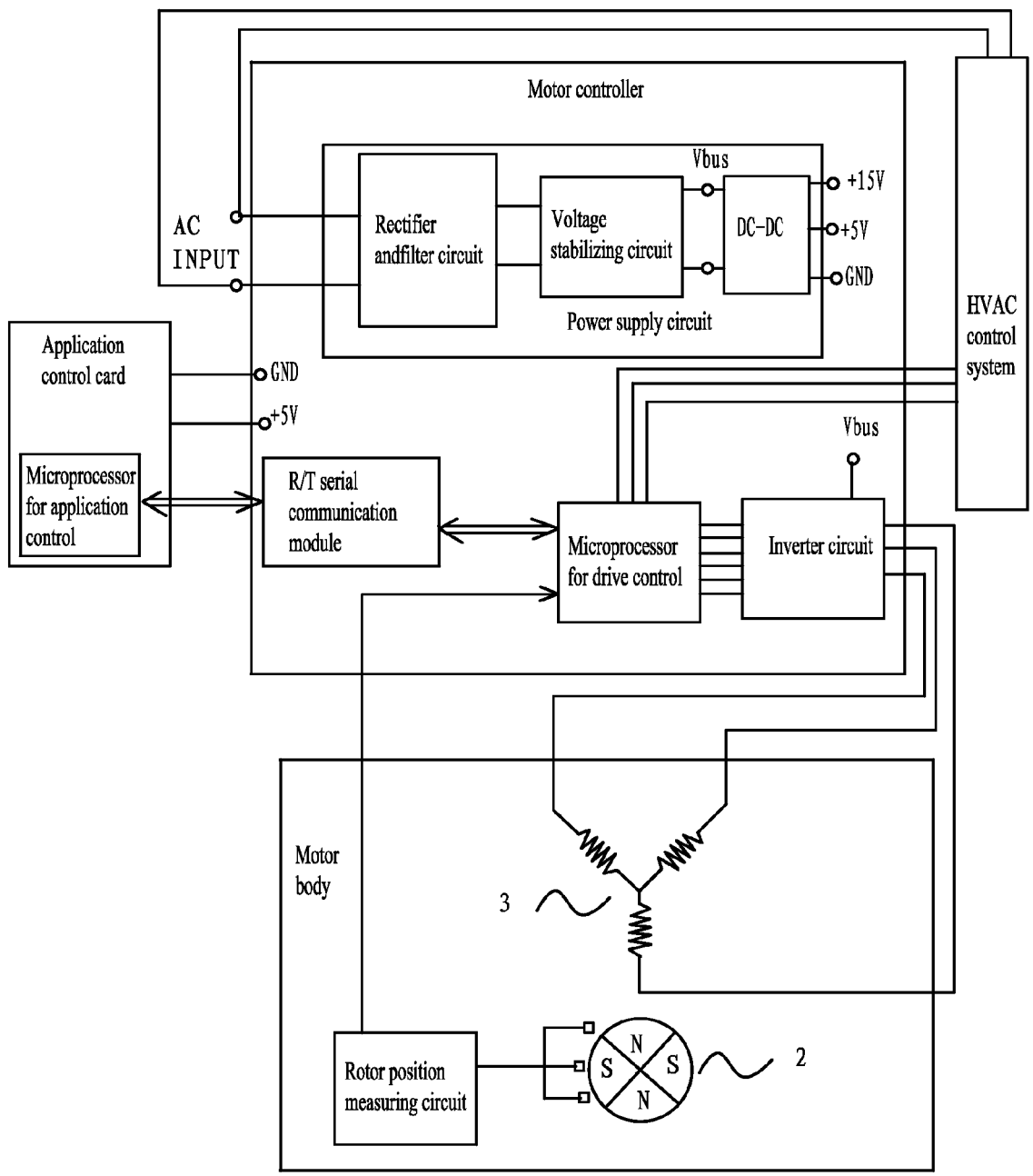
FIG. 9 is a first schematic block diagram of a combination of an HVAC control system and a DC permanent magnet synchronous motor in accordance with one embodiment of the invention.

As shown in FIG. 9, a combination of an HVAC control system and the DC permanent magnet synchronous motor is provided. The HVAC control system is directly connected to the DC permanent magnet synchronous motor via a connection socket. The first microprocessor and the HVAC control system are directly connected so that they can communicate.

Figure 10:
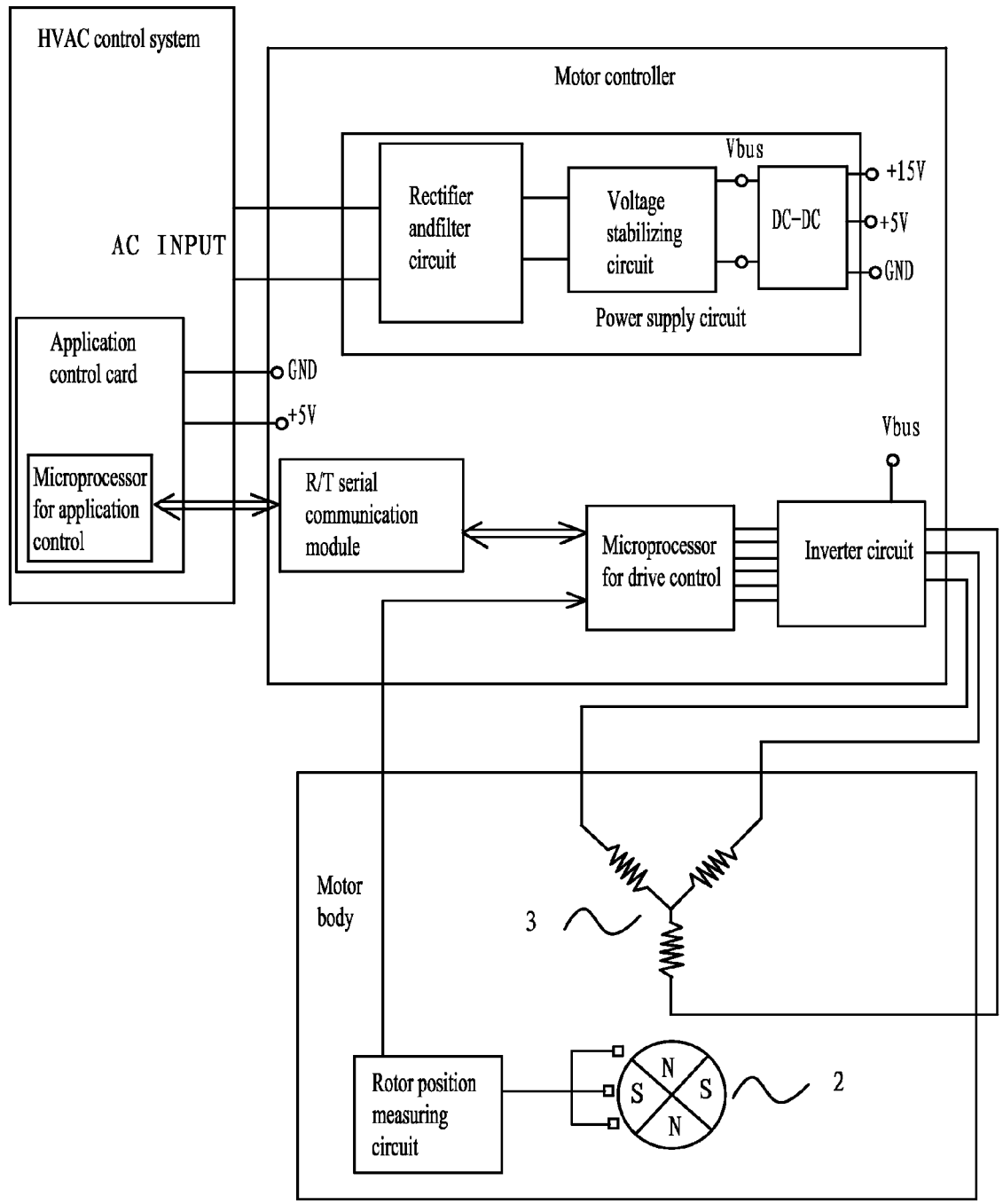
FIG. 10 is a second schematic block diagram of a combination of an HVAC control system and the DC permanent magnet synchronous motor in accordance with one embodiment of the invention.

As shown in FIG. 10, a combination of an HVAC control system and the DC permanent magnet synchronous motor is provided. The HVAC control system is directly connected to the DC permanent magnet synchronous motor via a connection socket, and the external control card is mounted on the HVAC control system.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A DC permanent magnet synchronous motor, comprising:
   a) a motor body, the motor body comprising a rotating shaft, a permanent rotor assembly, a stator assembly, and a housing assembly; the stator assembly comprising a stator core and a coil winding wound on the stator core;
   b) a motor controller, the motor controller comprising a first microprocessor for drive control, an inverter circuit, and a detection circuit for detecting operating parameters of the motor; the inverter circuit comprising an output end; and
   c) an external control card, the external control card comprising a second microprocessor for application control;
   wherein:
   the permanent rotor assembly and the stator assembly are magnetically coupled and are installed on the housing assembly;
   the operating parameters of the motor are input into the first microprocessor by the detection circuit;
   the first microprocessor outputs a PWM signal to control the inverter circuit;
   the output end of the inverter circuit is connected to the coil winding;
   the external control card is independent from the motor controller;
   a basic drive control part is disposed on the motor controller;
   an application control part is disposed on the external control card;
   the external control card is disposed outside the motor body;
   the external control card is connected to the motor body via an electric wire; and
   the second microprocessor and the first microprocessor are interconnected so that they can communicate.

2. The motor of claim 1, wherein the detection circuit further comprises a bus current measuring circuit and a bus voltage measuring circuit.

3. A combination of an HVAC control system and the DC permanent magnet synchronous motor of claim 1, wherein the HVAC control system is directly connected to the DC permanent magnet synchronous motor via a connection socket.

4. A combination of an HVAC control system and the DC permanent magnet synchronous motor of claim 1, wherein the HVAC control system is directly connected to the DC permanent magnet synchronous motor via a connection socket, and the external control card is mounted on the HVAC control system.

5. A DC permanent magnet synchronous motor, comprising:
   a motor body, the motor body comprising a rotating shaft, a permanent rotor assembly, a stator assembly, and a housing assembly; the stator assembly comprising a stator core and a coil winding wound on the stator core;
   a motor controller, the motor controller comprising a first microprocessor for drive control, an inverter circuit, and a detection circuit for detecting operating parameters of the motor; the inverter circuit comprising an output end; and
   an external control card, the external control card comprising a second microprocessor for application control;
   wherein:
   the permanent rotor assembly and the stator assembly are magnetically coupled and are installed on the housing assembly;
   the operating parameters of the motor are input into the first microprocessor by the detection circuit;
   the first microprocessor outputs a PWM signal to control the inverter circuit;
   the output end of the inverter circuit is connected to the coil winding;
   the external control card is disposed outside the motor body and is connected to the motor body via an electric wire;
   the second microprocessor and the first microprocessor are interconnected so that they can communicate;
   the detection circuit comprises a rotor position measuring circuit; and
   the rotor position measuring circuit inputs rotor position data into the first microprocessor and determines an occasion for current commutation, and the first microprocessor drives the inverter circuit whereby forming an open loop control mode.

6. The motor of claim 5, wherein the second microprocessor and the first microprocessor are interconnected for communication via an R/T serial communication module; and the first microprocessor sends operating data of the motor to the second microprocessor, the second microprocessor sends a control command to the first microprocessor according to the operating data of the motor, and the first microprocessor executes the control command and controls the inverter circuit to operate whereby forming a close loop control.

7. The motor of claim 5, wherein a constant air volume control module, a constant rotational speed control module, or a constant torque control module is stored in the second microprocessor.

8. The motor of claim 7, wherein the external control card communicates with the motor controller through four interface lines comprising a ground line, a +5 V power line, an RX communication line, and a TX communication line.

9. The motor of claim 7, wherein the external control card communicates with the motor controller through three interface lines comprising a ground line, a +5 V power line, and an R/T communication line.

10. The motor of claim 5, wherein the motor controller further comprises a power supply circuit;

the power supply circuit supplies power to each circuit part;

the power supply circuit, the first microprocessor, and the inverter circuit are integrated on a control circuit board;

the control circuit board is disposed inside a control box, and the control box is disposed at a bottom of the housing assembly;

the external control card is disposed outside the control box;

an input end of the power supply circuit is connected to an external AC input; and output ends of the power supply circuit comprise: a first output end for a bus voltage, a second output end for a +5 V voltage, and a third output end for a +15 V voltage, wherein, the bus voltage and the +15 V voltage are supplied to the inverter circuit, and the +5 V voltage are supplied to external devices.

11. The motor of claim 10, wherein the housing assembly comprises: a cylinder housing, a front end cover, and a rear end cover;

the permanent rotor assembly is disposed on the rotating shaft;

the stator assembly and the cylinder housing are connected together and are nested outside the permanent rotor assembly;

the front end cover and the rear end cover are disposed on two ends of the cylinder housing, respectively; and the rotating shaft is disposed on bearings of the front end cover and the rear end cover.

12. The motor of claim 11, wherein the motor controller is disposed outside the housing assembly; the control circuit board of the motor controller is disposed inside a casing; and the casing is connected to the rear end cover.

13. A DC permanent magnet synchronous motor, comprising:

a motor body, the motor body comprising a rotating shaft, a permanent rotor assembly, a stator assembly, and a housing assembly; the stator assembly comprising a stator core and a coil winding wound on the stator core;

a motor controller, the motor controller comprising a first microprocessor for drive control, an inverter circuit, and a detection circuit for detecting operating parameters of the motor; the inverter circuit comprising an output end; and an external control card, the external control card comprising a second microprocessor for application control;

wherein:

the permanent rotor assembly and the stator assembly are magnetically coupled and are installed on the housing assembly;

the operating parameters of the motor are input into the first microprocessor by the detection circuit;

the first microprocessor outputs a PWM signal to control the inverter circuit;

the output end of the inverter circuit is connected to the coil winding;

the external control card is disposed outside the motor body and is connected to the motor body via an electric wire;

the second microprocessor and the first microprocessor are interconnected so that they can communicate;

the detection circuit comprises a phase current measuring circuit; and the phase current measuring circuit inputs current data into the first microprocessor, and the first microprocessor drives the inverter circuit whereby forming an open loop control mode.

* * * * *